(12) United States Patent
Bonde et al.

(10) Patent No.: US 11,405,120 B2
(45) Date of Patent: Aug. 2, 2022

(54) SYSTEMS AND METHODS FOR SYNCHRONIZING TRANSMISSION OF WIRELESS DATA

(71) Applicant: Bose Corporation, Framingham, MA (US)

(72) Inventors: Casper Stork Bonde, Støvring (DK); Rasmus Abildgren, Skørping (DK); Douglas Warren Young, Arlington, MA (US)

(73) Assignee: Bose Corporation

(*) Notice: Subject to any disclaimer, the term of this patent is extended or adjusted under 35 U.S.C. 154(b) by 106 days.

(21) Appl. No.: 16/922,550

(22) Filed: Jul. 7, 2020

(65) Prior Publication Data
US 2022/0014295 A1    Jan. 13, 2022

(51) Int. Cl.
*H04J 3/06* (2006.01)
*H04W 56/00* (2009.01)
*H04W 4/80* (2018.01)
*H04S 1/00* (2006.01)

(52) U.S. Cl.
CPC .......... *H04J 3/0632* (2013.01); *H04J 3/0644* (2013.01); *H04J 3/0658* (2013.01); *H04W 56/002* (2013.01)

(58) Field of Classification Search
None
See application file for complete search history.

(56) References Cited

U.S. PATENT DOCUMENTS

| | | | |
|---|---|---|---|
| 10,034,255 B2* | 7/2018 | Ranasinghe | .............. H04L 7/00 |
| 10,341,758 B1 | 7/2019 | Tong et al. | |
| 2004/0208158 A1* | 10/2004 | Fellman | .............. H04L 12/6418 370/345 |
| 2014/0029701 A1* | 1/2014 | Newham | .............. H04J 3/0652 375/340 |
| 2018/0184234 A1* | 6/2018 | Chen | ..................... H04W 76/14 |
| 2019/0020431 A1* | 1/2019 | Chae | ................... H04W 56/001 |
| 2019/0230459 A1* | 7/2019 | Sridharan | ................ H04K 3/80 |
| 2020/0359134 A1* | 11/2020 | Tong | ..................... H04R 5/033 |
| 2021/0376884 A1* | 12/2021 | Linsky | .................... H04W 4/80 |

OTHER PUBLICATIONS

Woolley, Martin. Bluetooth Core Specification Version 5.2. Feature Summary [online]. Jan. 6, 2020 [retrieved on Jul. 13, 2020]. Retrieved from the Internet: <URL: https://www.bluetooth.com/bluetooth-resources/bluetooth-core-specification-version-5-2-feature-overview/>.

* cited by examiner

*Primary Examiner* — Jay L Vogel
(74) *Attorney, Agent, or Firm* — Bond, Schoeneck & King, PLLC

(57) ABSTRACT

An audio system, method, and computer program product for synchronizing device clocks. The systems, methods and computer program product can establish a first isochronous data stream between a peripheral device and a first device and establish a second isochronous data stream between the first device and a second device to send data between the first and second device. As the two data streams may rely on two different device clocks, e.g., one clock which defines the timing for the first isochronous data stream and a second clock which defines the timing for the second isochronous data stream, the systems, methods, and computer program disclosed herein are configured to maintain synchronization and/or synchronize the first clock with the second clock to prevent data loss due to clock drift.

16 Claims, 10 Drawing Sheets

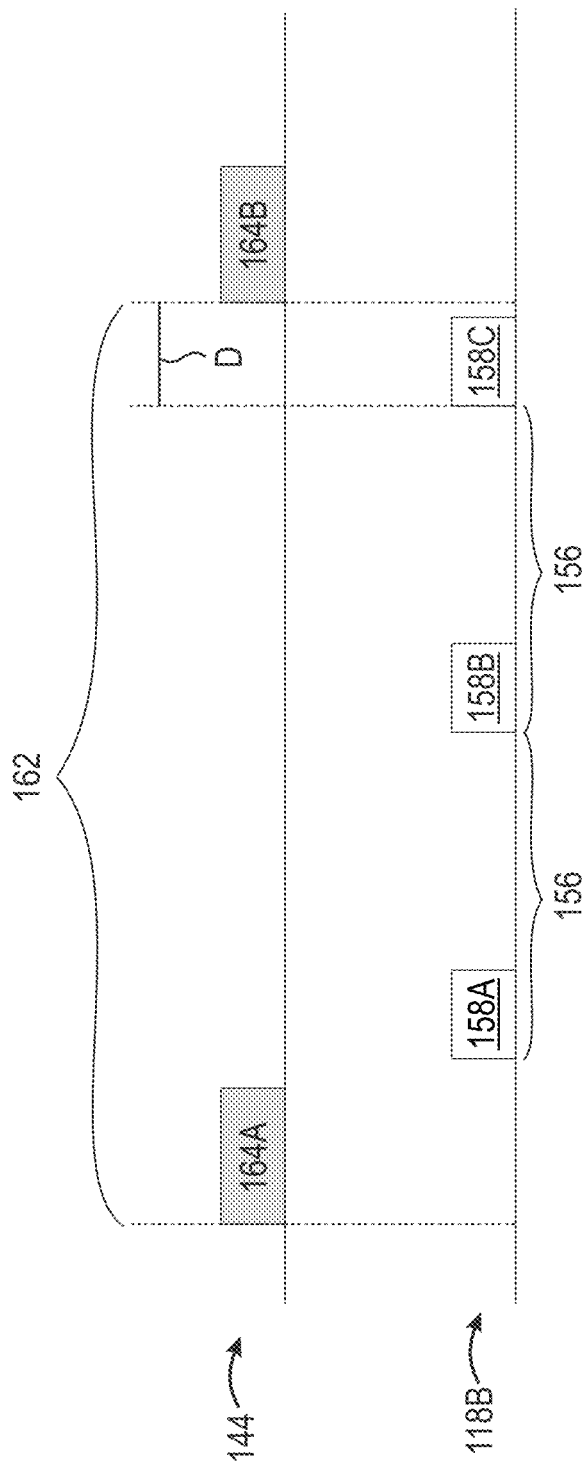

SYSTEMS AND METHODS FOR SYNCHRONIZING TRANSMISSION OF WIRELESS DATA

BACKGROUND

Aspects and implementations of the present disclosure are generally directed to systems and methods for broadcasting and receiving wireless data streams, for example, broadcasting and receiving wireless data streams between wireless devices.

Wearable wireless audio devices, e.g., wireless headphones, often utilize paired connections to stream wireless audio data from a source device. Typically, each wireless headphone receives a discrete stream of data specific to each wireless headphone, e.g., the source device produces two streams of data, one to the left headphone and one to the right headphone. A user, after placing each wireless audio device within or in proximity to their respective ears, may place the source device in a location that compromises the path of transmission of one of the data streams. For example, the user may place the source device in their right side or right-back pocket such that the path of transmission to the left headphone is obstructed by a substantial portion of the user's body. This "cross-body" problem results in a low quality data link between the source device and the left headphone leading to unacceptable data losses.

SUMMARY OF THE DISCLOSURE

The present disclosure relates to systems, methods, and a computer program product for synchronizing device clocks between the respective devices of a system. The systems, methods and computer program product can establish a first isochronous data stream between a peripheral device a first device and a second device, and can establish a second isochronous data stream between the first device and a second device to send data between the first and second devices. The two isochronous data streams may rely on two different device clocks, e.g., one clock associated with the peripheral device which defines the timing for the first isochronous data stream, and a second clock associated with the first device which defines the timing for the second isochronous data stream. In some examples, these clocks are maintained by two different devices within the system which can lead to clock drift between the two clocks. As the data being sent and received must be synchronized and offset to prevent overlapping transmission events, and therefore data loss, the methods disclosed herein provide for methods of synchronizing the device clocks to each other in order to prevent overlapping transmission events.

In some examples, the systems and methods discussed herein utilize wireless data transmission, specifically, wireless topologies for broadcasting and transmitting audio streams between devices. For example, Core Specification 5.2 released by the Bluetooth Special Interest Group (SIG) on Jan. 6, 2020, defines new features related to Bluetooth Low Energy (BLE) topologies. One feature described in the 5.2 Core Specification is Broadcast Isochronous Streams which utilize connectionless isochronous communications. A similar feature described by the 5.2 Core Specification is an LE Connected Isochronous Stream, which utilizes connection-oriented isochronous channels to provide a point-to-point isochronous communication stream between two devices, e.g., between peripheral device 102 and devices 104 and 106 (discussed below). As will be described below in detail, the present application is related to systems, devices, and methods to provide a user of a compatible device, with methods of interacting with isochronous communications of source devices, e.g., peripheral device 102 and/or the other devices in the system. In one example, the systems, devices, and methods discussed herein utilize Bluetooth Low-Energy audio topologies enabled by the 5.2 Core Specification (referred to herein as "LE Audio").

For example, LE Audio enables unicast wireless topologies (referred to as "connected isochronous streams") that allow a single Bluetooth audio source (e.g., a smart phone) to transmit multiple audio streams to separate Bluetooth devices at the same time, e.g., wireless headphones. These topologies are intended to improve Bluetooth operation for wireless headphones For example, in a cross-body situation, the user may place their phone in their pocket which is transmitting audio packets to each headphone in each of the user's ears. In this situation, one of the two headphones will always be cross-body which is very challenging for reliable radio frequency communications. The present disclosure provides a solution to this situation in that data may be transmitted between headphones rather than only from the source device to each headphone respectively by eliminating the risk of the second data stream drifting into overlap with the first data stream.

In one example, a method of synchronizing device clocks is provided, the method including: receiving, at a first device and a second device, a first isochronous data stream from a peripheral device, the first isochronous data stream having a first interval based on a first clock, the first clock maintained at the peripheral device, the first isochronous data stream comprising at least one transmission event; establishing a second isochronous data stream between the first device and a second device, the second isochronous data stream having a second interval associated with a second clock, the second clock maintained at the first device; and synchronizing the second clock with the first clock using the at least one transmission event.

In one aspect, establishing the second isochronous data stream includes exchanging information about a relationship between the first device and the peripheral device.

In one aspect, the at least one transmission event of the first isochronous data stream comprises a first anchor point, the second data stream includes at least one transmission event comprising a second anchor point, and wherein the at least one transmission event of the second data stream is received after a determined subinterval, the determined subinterval associated with a difference between the first anchor point and the second anchor point.

In one aspect, if the first device, the second device, or the peripheral device determine that a link quality between the first device and the peripheral device falls below a predetermined threshold, the method further includes reverting to an unsynchronized state wherein the second interval of the second isochronous data stream is independent of the first isochronous data stream, and wherein the first device is configured to receive a link layer request from the second device over the second isochronous data stream to shift the second anchor point if the determined subinterval falls below a predetermined threshold.

In one aspect, synchronizing the first clock with the second clock includes using a predictive algorithm to predict an expected increase or decrease in the determined subinterval and shifting the second anchor point prior to receiving a subsequent transmission event of the first isochronous data stream based on the expected increase or decrease in the determined subinterval.

In one aspect, the expected increase or decrease in the determined subinterval is based at least in part on a link quality determined between the peripheral device and the first device, the link quality between the first device and the second device, or the link quality between the peripheral device and the second device.

In one aspect, the at least one transmission event of the first isochronous data stream is associated with a first receiving window in the first isochronous data stream, the first receiving window having a first initial duration, and the at least one transmission event of the second isochronous stream is associated with a second receiving window of the second isochronous data stream, the second receiving window having a second initial duration, and wherein the second initial duration is configured to be widened by adding a maximum drift value to the second initial duration, wherein the maximum drift value is based at least in part on the latest anchor point of the first isochronous data stream.

In one aspect, the maximum drift value is added before the second initial duration.

In one aspect, the maximum drift value ranges between −2 ms and 2 ms.

In one aspect, the first device and the second device are audio devices.

In one example, a computer program product for synchronizing device clocks is provided, the computer program product including a set of non-transitory computer-readable instructions stored in a memory of a first device, the set of non-transitory computer-readable instructions being executable by a processor of the first device, and are configured to: receive a first isochronous data stream from a peripheral device, the first isochronous data stream having a first interval based on a first clock, the first clock maintained at the peripheral device, the first isochronous data stream comprising at least one transmission event; establish a second isochronous data stream between the first device and a second device, the second isochronous data stream having a second interval associated with a second clock, the second clock maintained at the first device; and synchronize the second clock with the first clock using the at least one transmission event.

In one aspect, establishing the second isochronous data stream includes exchanging information about a relationship between the first device and the peripheral device.

In one aspect, the at least one transmission event of the first isochronous data stream comprises a first anchor point, the second isochronous data stream includes at least one transmission event comprising a second anchor point, and wherein the at least one transmission event of the second isochronous data stream is received after a determined subinterval, the determined subinterval associated with a difference between the first anchor point and the second anchor point.

In one aspect, if the first device, the second device, or the peripheral device determine that a link quality between the first device and the peripheral device falls below a predetermined threshold, the processor is further configured to: revert to an unsynchronized state wherein the second interval of the second isochronous data stream is independent of the first isochronous data stream, and wherein the first device is configured to receive a link layer request from the second device over the second isochronous data stream to shift the second anchor point if the determined subinterval falls below a predetermined threshold.

In one aspect, synchronizing the first clock with the second clock includes using a predictive algorithm to predict an expected increase or decrease in the determined subinterval and shifting the second anchor point prior to receiving a subsequent transmission event of the first isochronous data stream based on the expected increase or decrease in the determined subinterval.

In one aspect, the expected increase or decrease in the determined subinterval is based at least in part on a link quality determined between the peripheral device and the first device, the link quality between the first device and the second device, or the link quality between the peripheral device and the second device.

In one aspect, the at least one transmission event of the first isochronous data stream is associated with a first receiving window in the first isochronous data stream, the first receiving window having a first initial duration, and the at least one transmission event of the second isochronous stream is associated with a second receiving window of the second isochronous data stream, the second receiving window having a second initial duration, and wherein the second initial duration is configured to be widened by adding a maximum drift value to the second initial duration, wherein the maximum drift value is based at least in part on the latest anchor point of the first isochronous data stream.

In one aspect, the maximum drift value is added before the second initial duration.

In one aspect, the maximum drift value ranges between −2 ms and 2 ms.

In one aspect, the first device and the second device are audio devices.

These and other aspects of the various embodiments will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various embodiments.

FIG. 8 illustrates a schematic illustration of first and second data streams according to the present disclosure.

DETAILED DESCRIPTION OF EMBODIMENTS

The present disclosure relates to systems, methods, and a computer program product for synchronizing device clocks between the respective devices of a system. The systems, methods and computer program product can establish a first isochronous data stream between a peripheral device a first device and a second device, and can establish a second isochronous data stream between the first device and a second device to send data between the first and second devices. The two isochronous data streams may rely on two different device clocks, e.g., one clock associated with the peripheral device which defines the timing for the first isochronous data stream, and a second clock associated with the first device which defines the timing for the second isochronous data stream. In some examples, these clocks are maintained by two different devices within the system which can lead to clock drift between the two clocks. As the data being sent and received must be synchronized and offset to prevent overlapping transmission events, and therefore data loss, the methods disclosed herein provide for methods of synchronizing the device clocks to each other in order to prevent overlapping transmission events.

Figure 1:
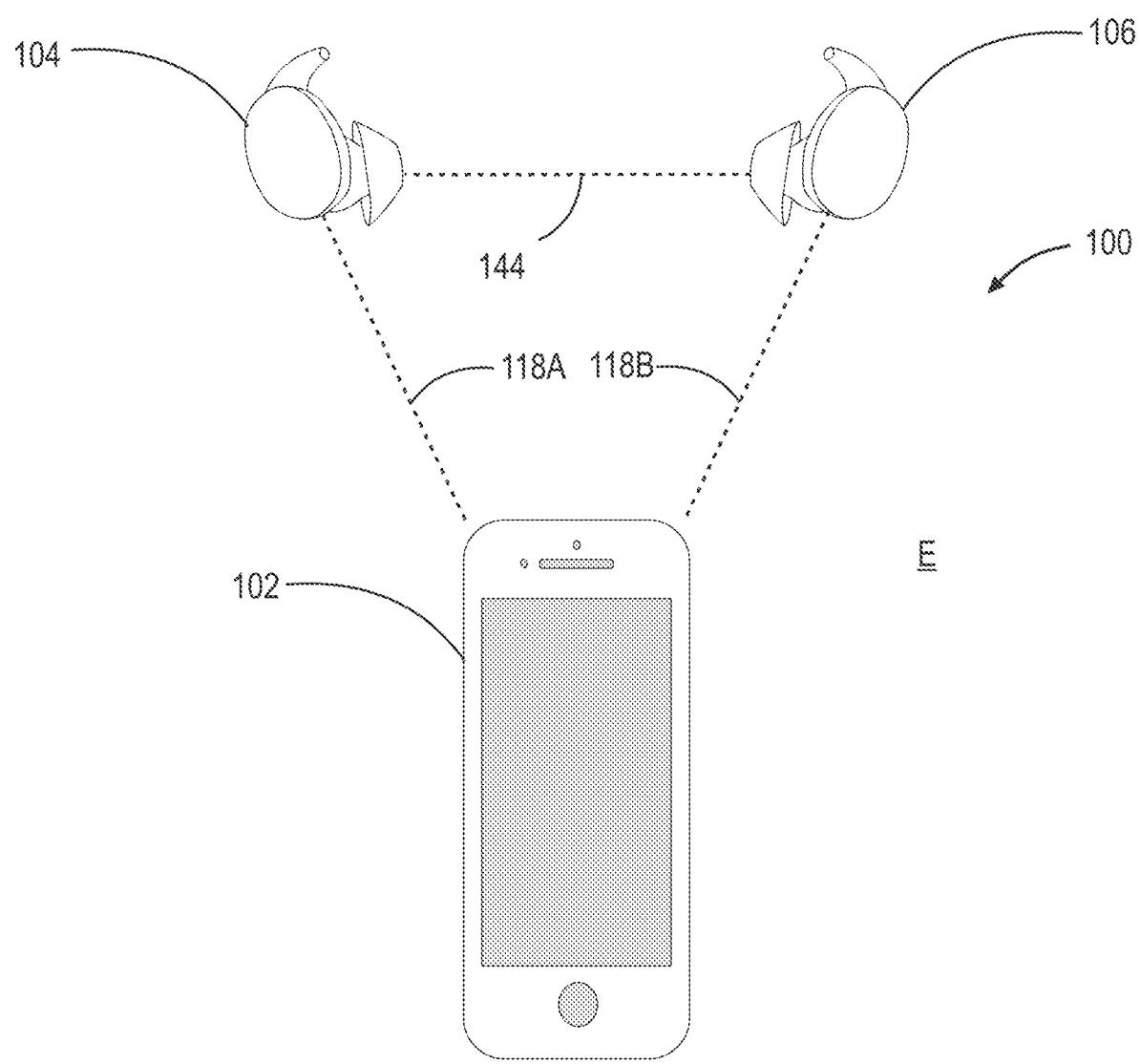
FIG. 1 is a schematic view of an audio system according to the present disclosure.

The term "wearable audio device", as used in this application, in addition to including its ordinary meaning or its meaning known to those skilled in the art, is intended to mean a device that fits around, on, in, or near an ear (including open-ear audio devices worn on the head or shoulders of a user) and that radiates acoustic energy into or towards the ear. Wearable audio devices are sometimes referred to as headphones, earphones, earpieces, headsets, earbuds or sport headphones, and can be wired or wireless. A wearable audio device includes an acoustic driver to transduce audio signals to acoustic energy. The acoustic driver can be housed in an earcup. While some of the figures and descriptions following can show a single wearable audio device, having a pair of earcups (each including an acoustic driver) it should be appreciated that a wearable audio device can be a single stand-alone unit having only one earcup. Each earcup of the wearable audio device can be connected mechanically to another earcup or headphone, for example by a headband and/or by leads that conduct audio signals to an acoustic driver in the ear cup or headphone. A wearable audio device can include components for wirelessly receiving audio signals. A wearable audio device can include components of an active noise reduction (ANR) system. Wearable audio devices can also include other functionality such as a microphone so that they can function as a headset. While FIG. 1 shows an example of an in-the-ear headphone form factor, in other examples the wearable audio device can be an on-ear, around-ear, behind-ear, over-the-ear or near-ear headset, or can be an audio eyeglasses form factor headset. In some examples, the wearable audio device can be an open-ear device that includes an acoustic driver to radiate acoustic energy towards the ear while leaving the ear open to its environment and surroundings.

The term "connected isochronous stream" as used herein, in addition to including its ordinary meaning or its meaning known to those skilled in the art, is intended to refer to an isochronous data stream which utilizes a preestablished, point-to-point communication link over LE Audio between, e.g., a source device and an audio device or a plurality of audio devices. In other words, a connected isochronous stream can provide and isochronous audio stream which utilizes at least one established reliable communication channel and/or at least one acknowledged communication channel between the source device and any respective audio devices.

The term "broadcast isochronous stream" as used herein, in addition to including its ordinary meaning or its meaning known to those skilled in the art, is intended to refer to an isochronous data stream which does not require a preestablished communications link to be established between the source device sending data and the audio device receiving data and does not require acknowledgements or negative acknowledgements to be sent or received.

The following description should be read in view of FIGS. 1-7. FIG. 1 is a schematic view of system 100 according to the present disclosure. System 100 includes a peripheral device 102 and a plurality of audio devices, i.e., at least first device 104 and second device 106. Peripheral device 102 is intended to be a wired or wireless audio device capable of sending and/or receiving data related to a first isochronous data stream 118 (discussed below) to at least one audio device, e.g., first device 104 and/or second device 106. In one example, as illustrated in FIG. 1, peripheral device 102 is a smart phone capable of sending first isochronous data stream 118 to, e.g., first device 104 and/or second device 106. Although not illustrated, it should be appreciated that peripheral device 102 can also be selected from at least one of: a personal computer, tablet, smart speaker, smart speaker system, smart hub, smart television, or any other device capable of sending or receiving first isochronous data stream 118 (discussed below).

Figure 2:
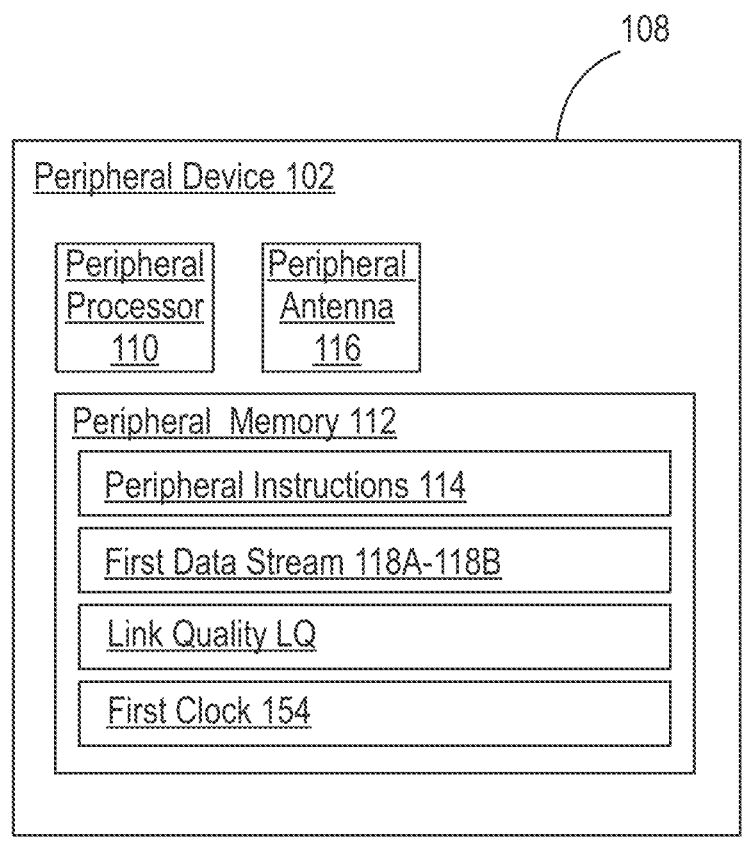
FIG. 2 is a schematic view of the components of a peripheral device according to the present disclosure.

As illustrated in FIG. 2, peripheral device 102 includes peripheral circuitry 108. Peripheral circuitry 108 includes peripheral processor 110 and peripheral memory 112 configured to execute and store, respectively, a plurality of non-transitory computer readable peripheral instructions 114 to perform the various functions of peripheral device 102 and peripheral circuitry 108 discussed herein. It should be appreciated that although not illustrated, peripheral circuitry 108 can further include a power interface arranged to obtain power from a mains power supply or from a battery, capacitor, super capacitor, or other power supply electrically connected to peripheral device 102. Peripheral circuitry 108 further includes a peripheral baseband device 116 configured to wirelessly send and/or receive data related to first isochronous data stream 118 (discussed below). Peripheral baseband device 116 can include at least one radio, at least one antenna, some form of automated gain control (AGC), a modulator and/or demodulator, and potentially a discrete processor for bit-processing.

As discussed above and illustrated in FIGS. 1 and 4, audio system 100 includes a plurality of devices, e.g., first device 104 and second device 106, where first device 104 and second device 106 are intended to be devices configured to receive first isochronous data stream 118 from peripheral device 102. It should be appreciated that throughout the present disclosure first device 104 and second device 106 are illustrated and described as audio devices, e.g., wireless headphones; however, in some examples, first device 104 and second device 106 can be selected from any type of device that is capable of sending and receiving data, e.g., first isochronous data stream 118 and second isochronous data stream 144 (discussed below). In one example, at least a portion of first isochronous data stream 118 corresponds with, or contains, audio data. Thus, in one example, first device 104 is configured to receive first isochronous data stream 118 and generate or render audible sound via first transducer 130 (discussed below and shown in FIG. 3A)

using the audio data or audio data packets obtained from the first isochronous data stream 118. Similarly, second device 106 is configured to receive first isochronous data stream 118 and generate or render audible sound via a second transducer 142 (shown in FIG. 3B). To these ends, first device 104 and second device 106 are intended to be wearable audio devices, e.g., a pair of truly wireless earbuds capable of receiving at least a portion of first isochronous data stream 118 from peripheral device 102. In one example, first device 104 is a right-ear headphone and second device 106 is a left-ear headphone, where each headphone can be configured to generate or render audible sound using the audio data contained in, e.g., first isochronous data stream 118. Although first device 104 and second device 106 are illustrated and described as a pair of headphones, it should be appreciated that first device 104 and second device 106 can also be other audio devices, for example, speakers, smart speakers, smart hubs, or any other device capable of receiving first isochronous data stream 118 and rendering audible sound within environment E. Although the present disclosure illustrates and describes first isochronous data stream as containing audio data, it should be appreciated that first isochronous data stream 118 can include other forms of data, e.g., at least a portion of first isochronous data stream 118 can include command control data associated with the data stream which can contain command data related to, e.g., sensor data obtained from one or more cameras, one or more microphones, one or more buttons or touch-capacitive sensors located on, in, or in communication with peripheral device, first device 104, and/or second device 106.

As discussed herein, first isochronous data stream 118, is intended to be an isochronous data stream. The term "isochronous data stream", as used herein, in addition to including its ordinary meaning or its meaning known to those skilled in the art, is intended to mean a data stream where the time interval between two individual transmission events is equal to a fixed time interval or a multiple of the fixed time interval. As discussed herein, first isochronous data stream 118 can be a connected isochronous stream or a broadcast isochronous stream as described above. In one example, as will be discussed below, first isochronous data stream 118 is a connected isochronous stream established between peripheral device 102 and first device 104, and between peripheral device 102 and second device 106. First data stream 118 can be generated, sent, or received using various communication protocols, e.g., Bluetooth classic, Bluetooth Low-Energy, LE Audio, or any Wi-Fi protocol (IEEE 802.11). In one example, first isochronous data stream 118 is a connected isochronous stream that utilizes an LE Audio protocol and the Low Complexity Communications Codex (LC3).

Figures 3A, 3B:
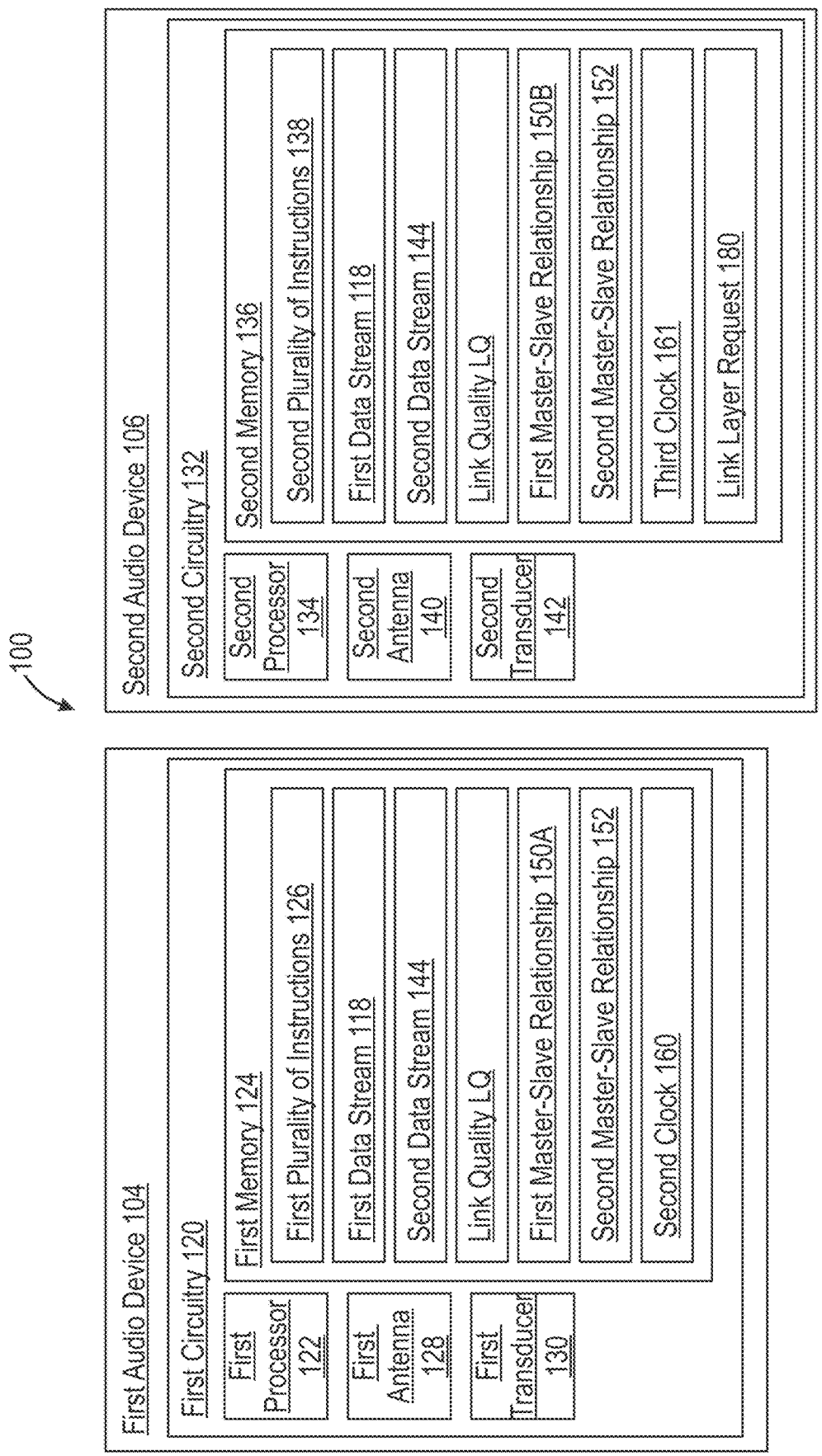
FIG. 3A is a schematic view of the components of a first device according to the present disclosure.
FIG. 3B is a schematic view of the components of a second device according to the present disclosure.

FIG. 3A schematically illustrates the components of first device 104. As illustrated, first device 104 further includes first circuitry 120. First circuitry 120 includes a first processor 122 and first memory 124 configured to execute and store, respectively, a first plurality of non-transitory computer-readable instructions 126 to perform the various functions of first device 104 and first circuitry 120 discussed herein. It should be appreciated that although not illustrated, first circuitry 120 can further include a power interface arranged to obtain power from, for example, a battery, capacitor, super capacitor, or other power supply electrically connected to first device 104. First circuitry 120 further includes a first baseband device 128 configured to send and/or receive at least a portion of first data stream 118 from, e.g., peripheral baseband device 116 of peripheral device 102. First baseband device 128 can include at least one radio, at least one antenna, some form of automated gain control (AGC), a modulator and/or demodulator, and potentially a discrete processor for bit-processing. First circuitry 120 also includes a first transducer 130 or other electromechanical component electrically connected to first processor 122 and first memory 124 and configured to render an electronic signal, e.g., an audio signal obtained from the audio data contained within first isochronous data stream 118, into audible sound.

Similarly, as illustrated in FIG. 3B, second device 106 further includes second circuitry 132. Second circuitry 132 includes a second processor 134 and second memory 136 configured to execute and store, respectively, a second plurality of non-transitory computer-readable instructions 138 to perform the various functions of second device 106 and second circuitry 132 discussed herein. It should be appreciated that although not illustrated, second circuitry 132 can further include a power interface arranged to obtain power from, for example, a battery, capacitor, super capacitor, or other power supply electrically connected to second device 106. Second circuitry 132 further includes a second baseband device 140 configured to send and/or receive at least a portion of first isochronous data stream 118 from, e.g., peripheral baseband device 116 of peripheral device 102. Second baseband device 140 can include at least one radio, at least one antenna, some form of automated gain control (AGC), a modulator and/or demodulator, and potentially a discrete processor for bit-processing. Second circuitry 132 also includes a second transducer 142 or other electromechanical component electrically connected to second processor 134 and second memory 136 and configured to render an electronic signal, e.g., an audio signal obtained from the audio data contained within first isochronous data stream 118, into audible sound.

In addition to receiving first isochronous data stream 118 from peripheral device 102 within environment E, first device 104 and second device 106 are further configured to establish a device-to-device connection between each other, e.g., between first device 104 and second device 106. This device-to-device connection can be used to provide a second isochronous data stream 144 (discussed below) between each other, e.g., where first device 104 is configured to send second isochronous data stream 144 to second device 106, or where second device 106 is configured to send second isochronous data stream 144 to first device 104. It should be appreciated that rather than forming a device-to-device connection between first device 104 and second device 106, first device 104, using first baseband device 128 can broadcast data to be received by second device 106 and vise versa, i.e., where second isochronous data stream 144 is a broadcast isochronous stream. In some examples, second isochronous data stream 144 is intended to be a data stream sent between first device 104 and second device 106 using connected isochronous stream (CIS); however, it should be appreciated that second data stream 144 can utilize other protocols, e.g., Bluetooth Classic, Bluetooth Low-Energy, LE Audio, Wi-Fi, Asynchronous Connection-Oriented logical transport (ACL) or any other protocol capable of sending data between first device 104 and second device 106.

Second isochronous data stream 144 can be established automatically or can be established based at least in part on a determined link quality LQ between each device within system 100 using link quality data, e.g., link quality LQ can be determined between peripheral device 102 and first device 104, between peripheral device 102 and second device 106, and in some examples, between first device 104 and second device 106. The determination of link quality LQ can include a determination of a signal strength or signalto-noise ratio related to the sending and/or receiving of any of the data or packets included in the pluralities of transmission events discussed below (e.g., first plurality of transmission events 158A-158F and second plurality of transmission events 164A-164E). For example, the link quality data can indicate a high link quality which corresponds with a high signal strength or high signal-to-noise ratio, e.g., a signal strength greater than a predetermined threshold value; or, a low link quality which corresponds with a low signal strength, e.g., a signal strength less than a predetermine threshold value. Additionally, link quality LQ can be determined based on a failure to receive a predetermined number of packets. For example, a high link quality can correspond to the respective devices acknowledging receipt of a first threshold of packets, e.g., a minimum number of packets of data provided as at least a part of first data stream 118 or second data stream 144. Conversely, a low link quality can correspond to the respective devices failing to acknowledge receipt of a second threshold of packets where the second threshold of packets is less than the first threshold of packets.

As will be discussed below, in one example, the link quality LQ can determine an operational mode within which system 100 operates. For example, in a first operational mode, the devices of system 100 determine that the link quality LQ between peripheral device 102 and first device 104 is high and that the link quality LQ between peripheral device 102 and second device 106 is high. In this first operational mode, first device 104 and second device 106 can simply continue to receive data, e.g., audio data, from first isochronous data stream 118, and render that data into audible sound within environment E. However, should the foregoing link quality LQ determinations change, e.g., should the link quality LQ between peripheral device 102 and first device 104 change to low link quality, or should the link quality LQ between peripheral device 102 and second device 106 change to low link quality, system 100 can automatically switch into a second operational mode or a third operational mode, respectively. Link quality LQ may be caused by a variety of factors, including, for example, positioning an object or body between peripheral device 102 and either device, i.e., first device 104 or second device 106. Thus, should the link quality LQ between peripheral device 102 and first device 104 change to low link quality, system 100 can switch into a second operational mode, where second device 106 is configured to receive data, e.g., audio data, from peripheral device 102 via first isochronous data stream 118, and forward at least a portion of that data to first device 104 via the second isochronous data stream 144, so that first device 104 can continue to receive and render audio data uninterrupted by the loss in link quality LQ. Alternatively, should the link quality LQ between peripheral device 102 and second device 106 change to low link quality, system 100 can switch into a third operational mode, where first device 104 is configured to receive data, e.g., audio data, from peripheral device 102 via first isochronous data stream 118, and forward at least a portion of that data to second device 106 via the second isochronous data stream 144, so that second device 106 can continue to receive and render audio data uninterrupted by the loss in link quality LQ. It should be appreciated that, within the third operational mode, second device 106 can continue to receive data, e.g., audio data from first isochronous data stream 118 and therefore, second device 106 can be a slave device to both first device 104 as well as peripheral device 102 which will be discussed below in detail. Therefore, although collectively referred to as "first isochronous data stream 118", first isochronous data stream 118 can be described and schematically illustrated as first isochronous data stream 118A between peripheral device 102 and first device 104 and first isochronous data stream 118B between peripheral device 102 and second device 106.

As discussed above, and illustrated in FIG. 4, first device 104 and second device 106 are configured to receive data, e.g., audio data, from peripheral device 102 via first isochronous data stream 118A and 118B, respectively, and second device 106 is configured to receive data, e.g., audio data, from first device 104. In this example, two piconets are formed, i.e., first piconet 146 defining the connection and exchange of data between peripheral device 102, first device 104 and second device 106, and a second piconet 148 defining the connection and exchange of data between first device 104 and second device 106. The first piconet 146 further defines a master-slave relationship 150A between peripheral device 102 and first device 104, e.g., where peripheral device 102 is a master and the first device 104 is a slave within the first piconet 146 with respect to data exchange and timing of the data exchanged, as well as a master-slave relationship 150B between peripheral device 102 and second device 106, e.g., where peripheral device 102 is a master and second device 106 is a slave within the first piconet 146. Similarly, second piconet 148 defines a second master-slave relationship 152 between first device 104 and second device 106, e.g., where first device 104 is a master and the second device 106 is a slave within second piconet 148 with respect to data exchange and timing of the data exchanged. In this way, first device 104 is simultaneously a slave device defined within first piconet 146 and a master device defined within second piconet 148. As mentioned above, and although not illustrated, second device 106 can continue to receive data, e.g., audio data, from first isochronous data stream 118B and therefore can simultaneously be a slave device within first piconet 146 and second piconet 148.

In system 100, all devices within a given piconet can utilize a single clock provided and maintained by the established master device as the base for data exchange. Therefore, within first piconet 146, as peripheral device 102 is the established master device, the device clock maintained by peripheral device 102, i.e., first clock 154 (shown in FIG. 2), is utilized to establish the isochronous interval, i.e., first interval 156 (shown in FIG. 5), that defines the interval of transmission events (e.g., first plurality of transmission events 158A-158F) of first isochronous data stream 118. Additionally, within second piconet 148, as first device 104 is the established master device, the device clock maintained by first device 104, i.e., second clock 160 (shown in FIG. 3A), is utilized to establish the isochronous interval, i.e., second interval 162 (shown in FIG. 5), that defines the interval of transmission events (e.g., second plurality of transmission events 164A-164E) of second data stream 144. In one example first interval 156 and second interval 162 are selected from a range between 1 ms to 4 seconds, e.g., 1 ms, 10 ms, 50 ms, 100 ms. First clock 154 and/or second clock 160 is/are intended to be a circuit, plurality of circuits, an electronic component or plurality of electronic components that are capable of receiving an electrical source signal and producing a repeatable response. For example, first clock 154 or second clock 160, may be a circuit, chip, or electronic component that includes a crystal oscillator or resonator that when a given electrical voltage is applied, vibrates or oscillates at a known frequency. From this vibration or oscillation, a combination of software or hardware may utilize this frequency to generate first interval 156 or second interval 162 which define the frequency of transmission events in both isochronous data streams, e.g., first plurality of transmission events 158A-158F and second plurality of transmission events 164A-164E. Additionally, in some examples, second device 106 can also include and maintain its own clock, i.e., third clock 161 (discussed below).

Figure 5:
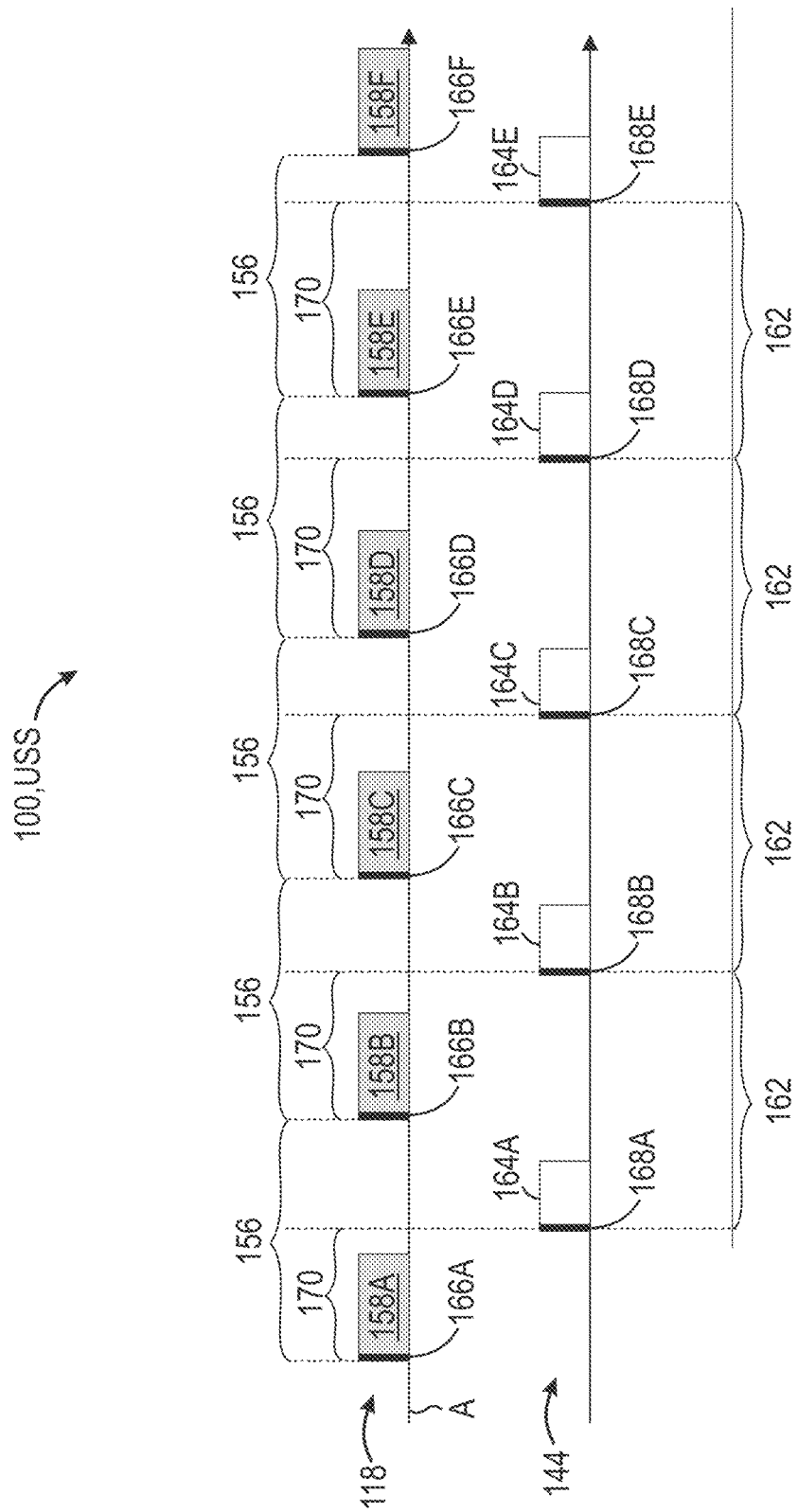
FIG. 5 illustrates a schematic illustration of first and second data streams according to the present disclosure.

As illustrated in FIG. 5, first plurality of transmission events 158A-158F and second plurality of transmission events 164A-164E define a window of time within first interval 156 or second interval 162, respectively, where the devices within a given piconet are tuned to send or receive data packets. For example, first plurality of transmission events 158A-158F define a window of time within first interval 156 that peripheral device 102 is configured to send a packet or plurality of packets of data, e.g., audio data, within first isochronous data stream 118 and define a window of time within first interval 156 that first device 104 and/or second device 106 is configured to receive a packet or plurality of packets of data within first isochronous data stream 118. Similarly, second plurality of transmission events 164A-164E define a window of time within second interval 162 that first device 104 is configured to send a packet or plurality of packets of data, e.g., audio data, within second isochronous data stream 144 and define a window of time within second interval 162 that second device 106 is configured to receive a packet or plurality of packets of data within second isochronous data stream 144.

Thus, each transmission event includes a transmission window and a receiving window. The transmission window is intended to be a window of time within the isochronous data streams described herein where one device of the system is configured to send data, and the receiving window is intended to be a window of time where one device of the system is configured to receive data, e.g., audio data packets. In one example, within first piconet 146, and within first isochronous data stream 118, the first transmission event of the first plurality of transmission events 158A-158F, includes a transmission window, i.e., a period of time within first interval 156 where peripheral device 102 is configured to send data, e.g., audio data, and includes a receiving window, i.e., a period of time within first interval 156 wherein first device 104 or second device 106 are configured to receive the data sent. In an ideal system, the transmission window and receiving window of each transmission event would perfectly overlap with respect to absolute time to ensure that the receiving devices capture at least the beginning of the transmission window and can adjust accordingly to ensure receipt of all of the data being sent.

Figure 4:
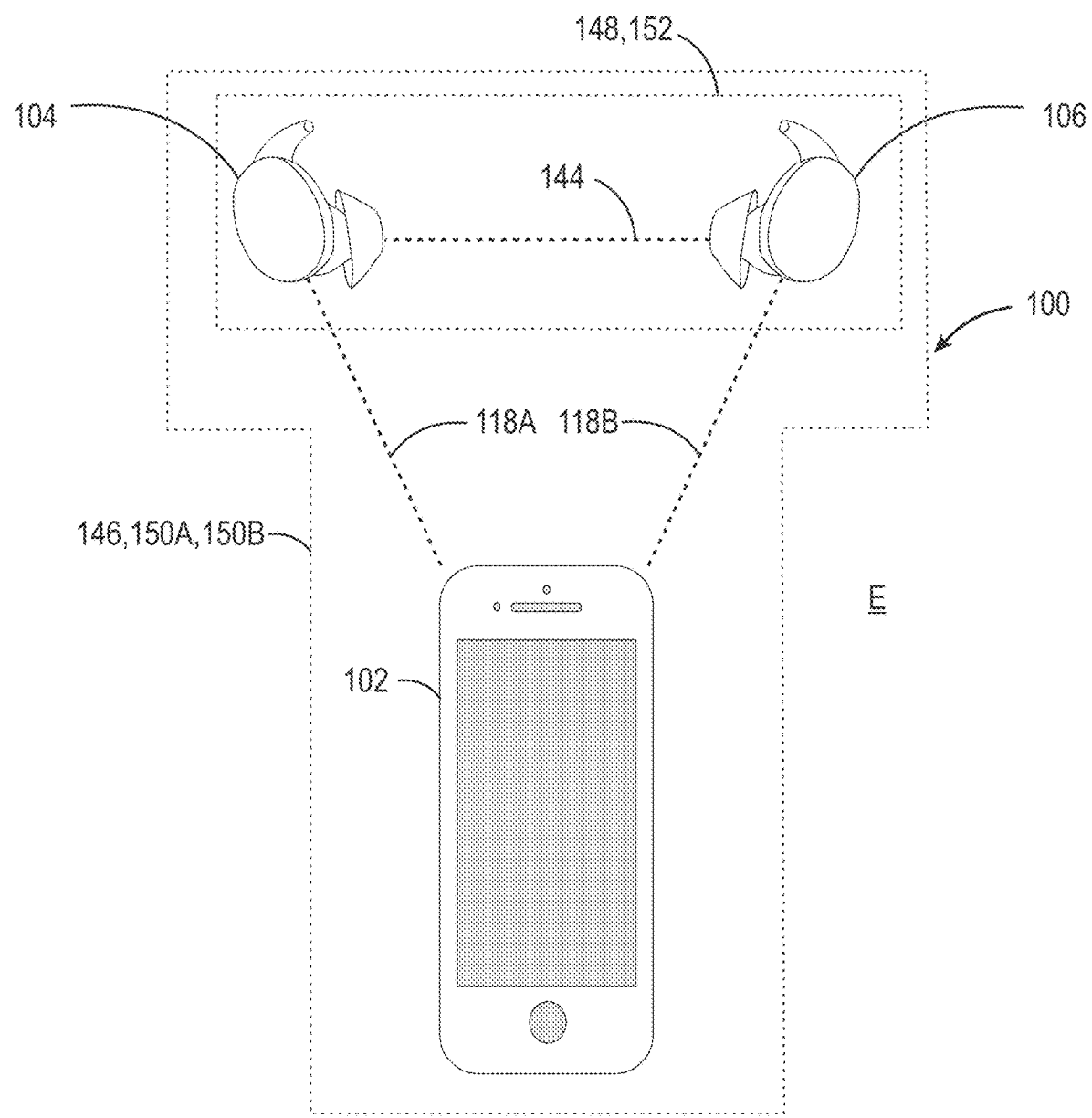
FIG. 4 is a schematic view of an audio system according to the present disclosure.

Each transmission event is defined by an anchor point, i.e., first plurality of transmission events 158A-158F of first isochronous data stream 118 are defined by first plurality of anchor points 166A-166F, respectively, and second plurality of transmission events 164A-164E of second data stream 144 are defined by second plurality of anchor points 168A-168E, respectively. In one example, as illustrated in FIG. 4, each anchor point defines the starting point of its respective transmission event. For example, first anchor point 166A of first transmission event 158A of first isochronous data stream 118 signals the beginning or start of the sending and receiving window defined by first transmission event 158A. It should be appreciated that each anchor point, i.e., each of the first plurality of anchor points 166A-166F and each of the second plurality of anchor points 168A-168E, can also be positioned at the center of each respective transmission window and/or each respective receiving window. As mentioned above, for a successful transfer of data, the receiving window shall overlap with the entire transmission window. The slave device, i.e., the device that maintains the receiving window can choose to close its receiving window early, e.g., before receiving a packet, if it determines that it missed the beginning of the transmission window of its respective master device. In this case the receiving window can be shorter than the transmission window. It should be appreciated that during a successful transfer, i.e., where the receiving window captures the beginning of the transmission window, the anchor point can be positioned at the beginning or middle of the receiving window. In the scenario where the slave device missed the packets of its respective master and the receiving window is closed early, the anchor point can be at the beginning, middle, or end of the receiving window.

In one example, as described above first device 104 is simultaneously operating within two piconets, e.g., first piconet 146 and second piconet 148. Thus, first device 104 is interacting with two separate data streams, i.e., first isochronous data stream 118A and second isochronous data stream 144. In one example, first device 104 can include a first baseband device 128 which may only include one antenna, and/or only one radio. Therefore, the timing of the transmission events of the first isochronous data stream 118 and the second isochronous data stream 144 must be synchronized and staggered or offset such that they do not occupy the same absolute time window, and ensure that first baseband device 128 will only ever be sending or receiving data from one of the two data streams over any given time period. Should any overlap between transmission events of each data stream occur, data may be lost as first baseband device 128 may only be able to reliably send and/or receive data from one stream at a time. As the timing of the transmission events of each respective data stream depends on the timing of the clocks of the master devices within each piconet, i.e., first clock 154 and second clock 160, it is necessary to detect and correct any clock drift that occurs between each clock during operation. For example, due to a variety of factors including changes in temperature between and within each device of system 100, as well as differences in calibration settings in hardware and/or software of each device of system 100, first clock 154 and second clock 160 can start to drift with respect to each other. Said another way, although first clock 154 and second clock 160 can start in a synchronized state (not shown), these subtle differences or variations can cause one or both of the clocks to drift out of synchronization over time. This phenomenon is referred to as clock drift, i.e., where one of the two clocks becomes unsynchronized with the other clock over time, and will be discussed below in further detail. Additionally, as mentioned above, drift may also occur between second clock 160, i.e., the clock maintained by first device 104, and third clock 161, i.e., the clock maintained by second device 106.

During operation, the devices of system 100 are configured to determine clock drift within the respective isochronous data streams using expected vs. actual receipt times for each packet within each transmission event. For example, within first piconet 146, and within first isochronous data stream 118, peripheral device 102 is configured to send, within each respective transmission window, packets of data at predetermined intervals, e.g., first interval 156, based on the clock maintained at the peripheral device, i.e., first clock 154. After the initial setup of first isochronous data stream 118, first device 104 knows this predetermined interval and will open a corresponding receiving window at the each multiple of the predetermined interval, as measured using the clock maintained at the first device 104, i.e., second clock 160, in an attempt to capture the packets sent by peripheral device 102. However, as mentioned above, various factors may cause first clock 154 or second clock 160 to speed up or slow down, i.e., drift with respect to absolute time, e.g., with respect to an atomic clock. Thus, the slave device within a given piconet, e.g., first device 104 within first piconet 146, knows the time within first interval 156 that it expects to receive data from peripheral device 102, i.e., an expected time. Therefore, if either first clock 154 or second clock 160 drift with respect to each other and/or with respect to absolute time, first device 104 will receive the data at a different time than the expected time, i.e., an actual time. The drift measured within first isochronous data stream 118 can therefore be determined by the difference between the actual time first device 104 receives the data from peripheral device 102 and the expected time that first device 104 expected to receive the data from peripheral device 102. Similarly, within second piconet 148, and within second isochronous data stream 144, first device 104 is configured to send, within each respective transmission window, packets of data at predetermined intervals, e.g., second interval 162, based on the clock maintained at the first device 104, i.e., second clock 160. After the initial setup of second isochronous data stream 144, second device 106 knows this predetermined interval and will open a corresponding receiving window at the each multiple of the predetermined interval, as measured using the clock maintained at the second device 106, i.e., third clock 161, in an attempt to capture the packets sent by first device 104. The drift measured within second isochronous data stream 144 can therefore be determined by the difference between the actual time second device 106 receives the data from first device 104 and the expected time that second device 106 expected to receive the data from first device 104. In these situations, when there is a determined difference between the expect and actual receipt times as determined by the slave devices within a given piconet, the slave may apply, for each packet received, an offset to its own clock that is equal to the difference between the expect and actual receipt times so that each slave device may synchronize its clock its respective master's clock and correct for any deviation.

Figure 6:
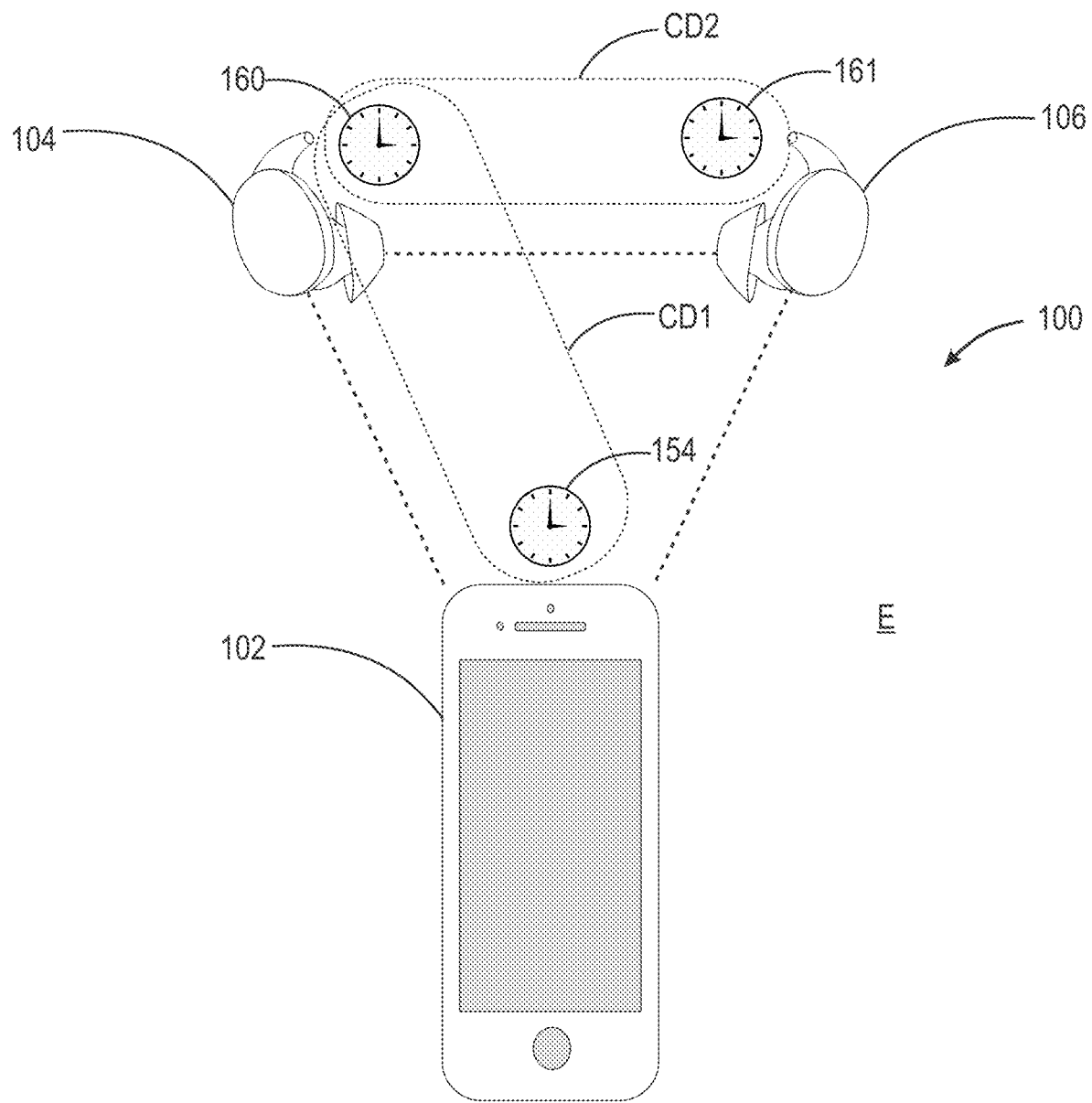
FIG. 6 is a schematic view of an audio system according to the present disclosure.

In addition to the clock drift examples described above, clock synchronization may be visualized using separate clock domains. For example, as illustrated in FIG. 6, first clock 154 and second clock 160 maintained by peripheral device 102 and first device 104, respectively, may define a first clock domain CD1. Additionally, second clock 160 and third clock 161 maintained by first device 104 and second device 106, respectively, define a second clock domain CD2. As will be discussed below, it is the objective of the first device 104, as the slave device within first piconet 146, to ensure that it's clock, i.e., second clock 160, is synchronized with the clock of its respective master within its clock domain, i.e., first clock domain CD1. Thus, after every packet received by first device 104, first device 104 can apply any needed offset to its time relative to the clock of its master, i.e., first clock 154 of peripheral device 102, so that both clocks within the first clock domain CD1 are synchronized, i.e., first clock 154 and second clock 160 are synchronized. Similarly, it is the objective of the second device 106, as the slave device within second piconet 148, to ensure that it's clock, i.e., third clock 161, is synchronized with the clock of its respective master within its clock domain, i.e., second clock domain CD2. Thus, after every packet received by second device 106, second device 106 can apply any needed offset to its time relative to the clock of its master, i.e., second clock 160 of first device 104, so that both clocks within the second clock domain CD2 are synchronized, i.e., second clock 160 and third clock 161 are synchronized.

As the two data streams within each respective clock domain are not linked or related when establishing or setting up the respective relationships, drift within the first isochronous data stream 118 (i.e., drift within first clock domain CD1) is independent of any drift experienced within second isochronous data stream 144 (i.e., drift within second clock domain CD2). For example, should the clock maintained by peripheral device 102, i.e., first clock 154, deviate from its initial configuration significantly, first device 104, i.e., the slave device to peripheral device 102, can offset for the significant deviation within first isochronous data stream 118 and/or within first clock domain CD1. However, as the clock maintained by first device 104 within second clock domain CD2 may continue to operate as it did upon initial configuration of second isochronous data stream 144, and therefore no offset is needed from second device 106, the drifts experienced within second isochronous data stream 144 is independent from any drift experienced in first isochronous data stream 118. However, in this scenario, where one data stream experiences a different drift than the other data stream, eventually, the transmission events within first isochronous data stream 118 and second isochronous data stream 144 will overlap as shown in FIG. 5.

Thus, to avoid overlapping transmission events during operation, one or more of the devices of system 100 will determine, measure, or otherwise calculate the difference between the last anchor point of the first plurality of anchor points 166A-166F, and the last anchor point of the second plurality of anchor points 168A-168E. This determined interval, i.e., determined subinterval 170 can be utilized to determine how much, if any, the transmission events of the first isochronous data stream 118 have drifted with respect to the transmission events of the second isochronous data stream 144. Specifically, any deviation or change in determined subinterval 170 after each transmission event of each respective data stream, will indicate a drift between first clock 154 and second clock 160 within first clock domain CD1, and/or a drift between second clock 160 and third clock 161 within second clock domain CD2. As illustrated in FIG. 5, which schematically illustrates first isochronous data stream 118 and second isochronous data stream 144 in an unsynchronized state USS, determined subinterval 170 increases as absolute time progresses (left-to-right in FIG. 5 indicates a forward progression in time). As shown, any deviation or change in determined subinterval 170 compounds after each pair of transmission events until eventually a transmission event of first isochronous data stream 118 and a transmission event of second isochronous data stream 144 overlap in absolute time (indicated spatially along arrow A). Specifically, the deviation in determined subinterval 170 will eventually cause transmission event 158F of first isochronous data stream 118 to overlap with transmission event 164E of second isochronous data stream 144 causing data loss as first baseband device 128 of first device 104 may only be able to send and receive data related to one stream at any given time. It should be appreciated that, although not illustrated, each device of system 100 can obtain timing information from meta data included in the packets sent and received within each data stream. For example, expected and actual time stamp information may be encoded into the preambles, headers, or payloads of each packet sent or received within first isochronous data stream 118 and/or second isochronous data stream 144. In this way, each device can determine the determine subinterval 170 related to each transmission event. Additionally, it should be appreciated that timing information can be collected even though a full packet was not successfully received within a given receiving window. For example, the presence of a preamble, full or partial header, or full or partial payload (with or without errors), can be used to determine the timestamp information of the respective transmission events and/or anchor points.

In one example, during operation of system 100, to prevent data loss caused by overlapping transmission events, system 100 is configured to synchronize device clocks periodically throughout the operation of system 100. In one example, first device 104 is configured to synchronize its clock, i.e., second clock 160 with the clock of its master, e.g., the clock maintained by peripheral device 102, i.e., first clock 154, after each packet that it receives. As the second clock 160 is now synchronized with the clock maintained by the peripheral device 102, i.e., first clock 154, the predetermined interval used within second isochronous data stream 144 will be measured with respect to a clock that is already synchronized with the clock maintained by the peripheral device 102. Thus, the transmission events of the second isochronous data stream 144 will never overlap with the transmission events of the first isochronous data stream 118 as the clock maintained by first device 104 keeps the same time within both piconets. Said another way, first device 104 and second device 106 are configured to utilize the relationships between each device within system 100, and to send and receive packets based on the knowledge they share a common master clock. For example, first device 104 and second device 106 can exchange data, e.g., within a first or first plurality of packets sent and/or received within second plurality of transmission events 164A-164E of second isochronous data stream 144, which includes information or data related to the existence of the first piconet 146 and second piconet 148 as well as the first master-slave relationship 150A between peripheral device 102 and first device 104 and the second master-slave relationship 152 between first device 104 and second device 106. From this information, first device 104 and/or second device 106 can determine that, e.g., first clock 154, i.e., the clock maintained by peripheral device 102, should be a common master clock for both data streams. Upon agreeing to this determination, first device 104 can continuously adjust the second interval 162 derived from second clock 160 so that it is synchronized (with the agreed upon offset) to the first interval 156 derived from first clock 154. In this way, the determined subinterval 170 becomes a fixed value and transmission events from first data stream 118 and transmission events from second data stream 144 never overlap. In one example, first device 104 can determine clock drift based off the first packet it receives within the first transmission event 158A or the anchor point of the first transmission event 158A of first data stream 118, and apply a compensating shift to the second clock 160. However, there is a possibility that the first packet and/or the perception of the anchor point of the first transmission event is simply noise. Therefore, system 100 may wait a predetermined number of successful transmission events before first device 104 applies any synchronization or compensating shifts to the second clock 160 to avoid synchronizing based on noise.

Furthermore, in situations where link quality LQ between peripheral device 102 and first device 104 or second device 106 is low, the relationships discussed above may be maintained, i.e., where peripheral device 102 and first device 104 are both master devices within their respective piconets. For example, should link quality LQ between peripheral device 102 and second device 106 be low, first device 104 will continuously adjust second interval 162 as discussed above to maintain synchronization. Conversely, should link quality LQ between peripheral device 102 and first device 104 be low, a different synchronization technique may be used. In this example, as first device 104 is the master device, the loss of a stable connection to peripheral device 102 prevents first device 104 from continuously adjusting second interval 162 based on the clock maintained at the peripheral device 102, i.e., first clock 154. Instead, as second device 106 still maintains a high link quality LQ with peripheral device 102 over first isochronous data stream 118B, data loss can be prevented by sending link layer requests 180 from second device 106 to first device 104 over second isochronous data stream 144 to instruct first device 104 to adjust and/or synchronize its clock, i.e., second clock 160, to first clock 154. It should be appreciated that the sending of these link layer requests 180 does not need to occur between each scheduled transmission event and instead can be sent after multiple transmission events have passed unsynchronized to periodically correct for small drifts.

Alternatively, or in addition to the foregoing, in periods where the link quality LQ between peripheral device 102 and first device 104 is low or cuts out completely, system 100 can utilize one or more predictive algorithms, e.g., deep learning or machine learning algorithms, to adaptively predict the amount of clock drift that is to be anticipated between each respective pair of transmission events, and apply an offset to one of the clocks, e.g., second clock 160, or third clock 161, to preemptively compensate for the predicted clock drift, and therefore, maintain proper synchronization of clocks and therefore proper synchronization of transmission events. The one or more predictive algorithms can be supervised or unsupervised, and can accept inputs that include but are not limited to: the clock drift data from previous transmission events, e.g., average deviation or change in determined subinterval 170 from all or a portion of any previous transmission events; the temperature of peripheral device 102; the temperature of first device 104; the temperature of second device 106; the link quality LQ between peripheral device 102 and first device 104, the link quality LQ between peripheral device 102 and second device 106, the link quality LQ between first device 104 and second device 106, the total or average amount of time each device has been in sleep, hibernation, or other low-power mode; truncation error information, e.g., truncation errors logged during initial or subsequent calibrations of any of the devices of audio system 100, or clock drift outliers. Clock drift outliers can include deviations or changes in determined subinterval 170 that are above a predetermined threshold or below a predetermined threshold that indicate that the algorithm should discard or weight lightly data from statistically deviant results.

Additionally, in one example, first isochronous data stream 118 utilizes an LE Audio protocol and second isochronous data stream 144 utilizes an Asynchronous Connection-Oriented (ACL) logical transport protocol. Each of these data streams can allow for a maximum amount of drift to occur before the respective connections between devices are terminated. In one example, each clock within system 100 is allowed to drift a maximum of 500 ppm with respect to absolute time, and/or with respect to the clock of each device's respective master. For example, if first interval 156 of first isochronous data stream 118 is selected as 4 seconds, the drift as measured by the slave device, e.g., first device 104, using expected and actual time values for the transmission events within first isochronous data stream 118 are acceptable within a predetermined magnitude, i.e., first isochronous data stream 118 will allow a first maximum drift value 172, between −2 ms to 2 ms before the connection is terminated or packets are lost. This first maximum drift value range is based on an acceptable accuracy of 500 ppm for the clocks within first isochronous data stream 118. Similarly, second isochronous data stream 144 having second interval 162 (which should be similar to first interval 156 but offset so that each transmission event of second isochronous data stream 144 is sent between each transmission event of first isochronous data stream 118) can have a second maximum drift value 174 between −2 and 2 ms before the connection is terminated or packets are lost. In other examples, depending on the parameters of the connection information initially exchanged by the devices of system 100, the isochronous intervals could be selected from any interval between 2 ms to 4 seconds, e.g., 5 ms, 10 ms, 15 ms, 50 ms, 100 ms, 1 second, 2 second, 3 second, etc. In each example, each clock is allowed to drift 500 ppm with respect to its master's clock, e.g., an interval of 10 ms results in a maximum drift value of −5 μs to 5 μs. Accordingly, as discussed above, during the initial exchanges of information used to establish the various connections between devices of system 100, each slave device, e.g., first device 104 in first piconet 146 and second device 106 in second piconet 148, establishes a receiving window where each device's respective baseband device, e.g., first baseband device 128 and second baseband device 140, are configured to be in a receiving mode in order to receive the first packet of each respective data stream.

Figure 7A:
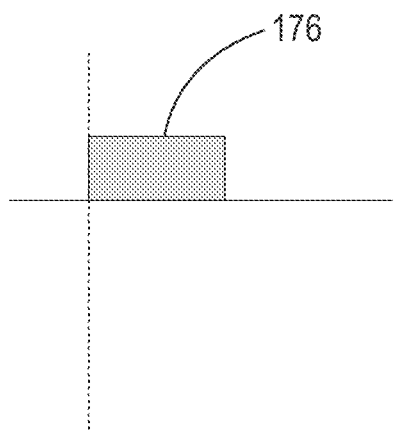
FIG. 7A illustrates a first receiving window according to the present disclosure.
Figure 7B:
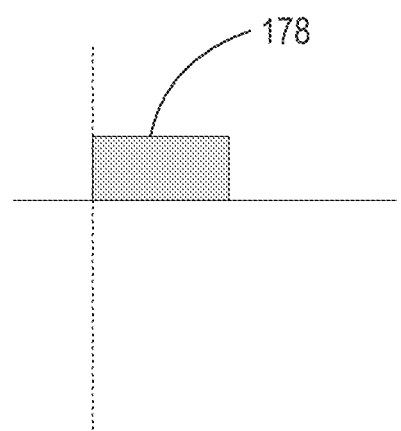
FIG. 7B illustrates a second receiving window according to the present disclosure.
Figure 7C:
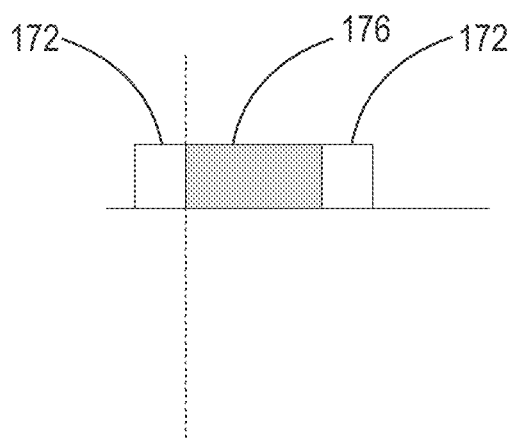
FIG. 7C illustrates a first receiving window according to the present disclosure.
Figure 7D:
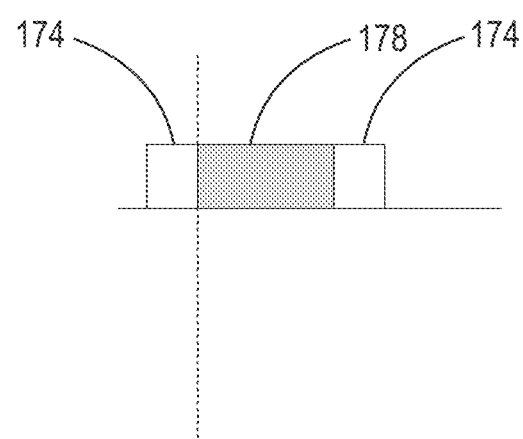
FIG. 7D illustrates a second receiving window according to the present disclosure.

As illustrated in FIGS. 7A-7D, as first device 104 is the slave device and therefore the receiver device within first piconet 146, first device 104 can automatically widen its receiving window, i.e., first receiving window 176 to account for the maximum allowable drift within the first isochronous data stream 118 and/or with first clock domain CD1. For example, as shown in FIG. 7C, and as drift can be a positive drift or a negative drift, i.e., movement of the transmission events and/or the anchor points closer together or farther apart, first receiving window 176 can be widened by applying or adding the first maximum drift value 172 to either side of the first receiving window 176 to widen the window's initial duration with the addition of two first maximum drift values 172. Similarly, as second device 106 is the slave device and therefore the receiver device within second piconet 148, second device 106 can automatically widen its receiving window, i.e., second receiving window 178, to account for the maximum allowable drift within the second isochronous data stream 118 and/or the second clock domain CD2. Thus, as shown in FIG. 7D, second receiving window 178 can be widened by applying or adding the second maximum drift value 174 to either side of the second receiving window 178 to widen the window's initial duration with the addition of two second maximum drift values 174. By extending the first and second receiving windows in this way, system 100 ensures that the receiving windows are wide enough to capture the anchor points of the next transmission event in each of the respective data streams. In some examples, the receiving windows discussed herein will center themselves about a point in time where they are expecting the anchor point for the next transmission event to be. It should also be appreciated that even in the widened state, the widened receiving windows can be cut short once all packet data has been received, i.e., the respective slave devices may terminate the widened receiving windows once the last bit of data has been received to save power.

As discussed above, and illustrated in FIG. 8, once second device 106 knows that there is a common master clock, e.g., that first device 104 is has synchronized its clock with the clock of the peripheral device 102, window widening employed by second device 106 can be reduced using the latest transmission event of either first isochronous data stream 118B or the latest transmission event of second isochronous data stream 144, as they should be synchronized to the same clock frequency. For example, as illustrated in FIG. 8, system 100 may establish a successful stream between peripheral device 102 and second device 106 (i.e., first isochronous data stream 118B), at a first interval 156, and may established a successful stream between first device 104 and second device 106 (i.e., second isochronous data stream 144) at second interval 162, where first interval 156 is less than second interval 162. In this example, system 100 can utilize the last anchor point of the first isochronous data stream 118B to reduce the value or values used to widen second receiving window 178. As second device 106 knows its relationship to the source devices of both data streams, second device 106 can derive the difference D between the last anchor point of second isochronous data stream 144 and the last anchor point of the last transmission event of its own connection with peripheral device 102, i.e., from the last transmission event of first isochronous data stream 118B, to reduce the widening of second receiving window 178 to be smaller or narrower than shown in FIG. 7D. In one example, rather than multiple milliseconds of widening discussed above, the time difference between the last transmission event of first data stream 118B and the last transmission event of second data stream 144 is relatively small, e.g., on the order of several microseconds. In one example, in a configuration where first isochronous data stream 118B has a first interval 156 of 10 ms, the reduced drift time derived from the difference in the last transmission events of both streams may reduce the window widening to 10 μs on either side of the initial window duration. Therefore, the ability to reduce the width of the window widening by this significant magnitude, reduces the power consumption needed to stay in receiving mode and creates more available airtime.

This technique for reduction of window widening of second receiving window 178 can be employed with or without an active second isochronous data stream 144 and can be extended based on a combination of the foregoing techniques. For example, should second device 106 know that first device 104 is continuously adjusting or updating second clock 160, i.e., based on knowledge that there is a common master clock as discussed above, then second device 106 knows that first device 104 synchronizes its clock, i.e., second clock 160, to the clock maintained by peripheral device 102, i.e., first clock 154. Therefore, second device 106 can calculate the drift period it is experiencing and adjust for it automatically based on the last packet received from first data stream 118B rather than the last packet it received from first device 104.

Figure 9:
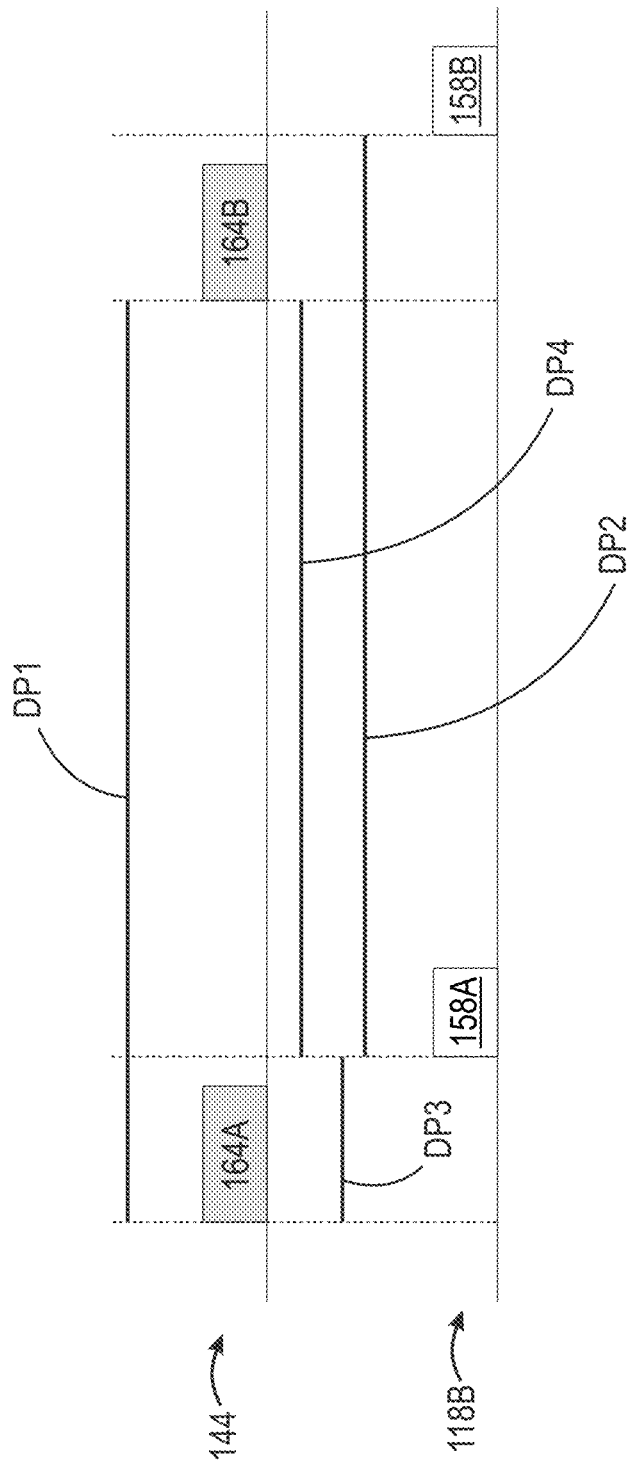
FIG. 9 illustrates a schematic illustration of first and second data streams according to the present disclosure.

FIG. 9 also illustrates another example of the reduction of window widening discussed above. As shown, system 100 may establish a successful stream between peripheral device 102 and second device 106 (i.e., first isochronous data stream 118B), and may established a successful stream between first device 104 and second device 106 (i.e., second isochronous data stream 144), where the interval of first isochronous data stream 118B is substantially similar, if not identical, to the interval of the second isochronous data stream 144. As second device 106 knows that the transmission events of second isochronous data stream 144 are based on a clock that is synchronized with the clock that is sending the transmission events of first isochronous data stream 118B, the normal window widening for second receiving window 178 can be reduced based on the differences between the anchor points of the latest packets received within either isochronous data stream. Without employing the window widening reduction methods described herein, second receiving window 178 would be widened by adding a first drift period DP1 of the second isochronous data stream 144 with the second drift period DP2 of the first isochronous data stream 118B. However, in the example described above, using a common master clock allows second device 106 to know its relationship to the source devices of both data streams, and second device 106 can use the difference between the last anchor point of second isochronous data stream 144 and the last anchor point of the last transmission event of its own connection with peripheral device 102, i.e., from the last transmission event of first isochronous data stream 118B, to reduce the widening of second receiving window 178 to be smaller or narrower than shown in FIG. 7D. In one example, rather than the combination of first drift period DP1 and second drift period DP2 to determined window widening for second receiving window 178, system 100 can utilize only the third drift period DP3, defined by the difference in the anchor point of first transmission event 164A of second isochronous data stream 144 and the first transmission event 158A of first isochronous data stream 118B, which results in a substantially smaller window widening. Alternatively, system 100 can utilize only fourth drift period DP4 defined by the difference in the anchor point of first transmission event 158A of first isochronous data stream 118B and the second or subsequent transmission event 164B of second isochronous data stream 144, which results in a smaller window widening than using first drift period DP1 and second drift period DP2.

It should be appreciated that system 100 can utilize software, i.e., any non-transitory computer-readable instructions or combination of the non-transitory computer-readable instructions discussed herein to measure, calculate, and/or adjust first clock 154 and/or second clock 160, or second clock 160 and/or third clock 161 so that they are synchronized. Additionally, it should be appreciated that peripheral device 102, first device 104, and/or second device 106 can utilize a controller, physical electronic component, or plurality of electronic components to synchronize and/or tune the clocks as discussed herein.

Figure 10:
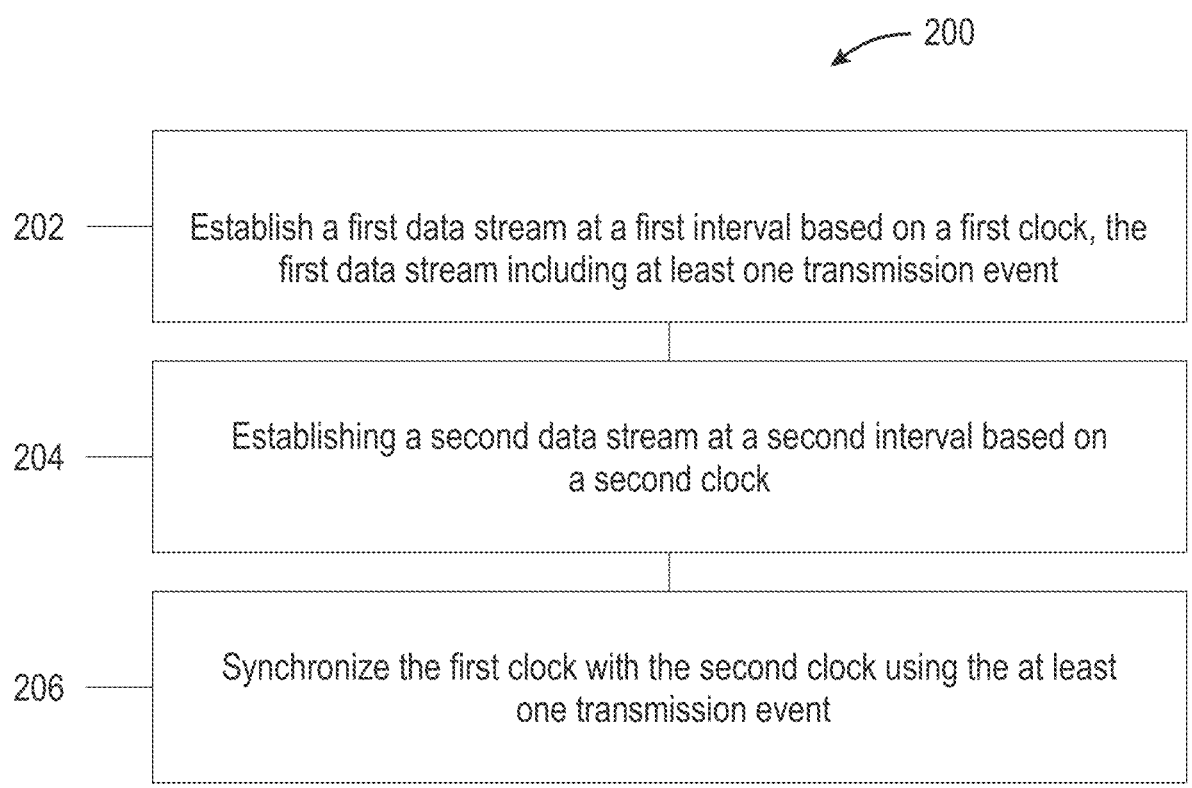
FIG. 10 is a flow chart illustrating the steps of a method according to the present disclosure.

FIG. 10 is a flow chart illustrating the steps of method 200 according to the present disclosure. Method 200 includes, for example, receiving, at a first device 104 and a second device 106, a first isochronous data stream 118A-118B (collectively referred to as "first data stream 118") from a peripheral device 102, the first isochronous data stream 118 having a first interval 156 based on a first clock 154, the first clock 154 maintained at the peripheral device 102, the first isochronous data stream 118 comprising at least one transmission event 158A-158F (step 202); establishing a second isochronous data stream 144 between the first device 104 and a second device 106, the second isochronous data stream 144 having a second interval 162 associated with a second clock 160, the second clock 160 maintained at the first device 104 (step 204); and synchronizing the second clock 160 with the first clock 154 using the at least one transmission event 158A-158F (step 206).

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of" or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The above-described examples of the described subject matter can be implemented in any of numerous ways. For example, some aspects may be implemented using hardware, software or a combination thereof. When any aspect is implemented at least in part in software, the software code can be executed on any suitable processor or collection of processors, whether provided in a single device or computer or distributed among multiple devices/computers.

The present disclosure may be implemented as a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to examples of the disclosure. It will be understood that each block of the flowchart illustrations and/or block diagrams, and combinations of blocks in the flowchart illustrations and/or block diagrams, can be implemented by computer readable program instructions.

The computer readable program instructions may be provided to a processor of a, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various examples of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Other implementations are within the scope of the following claims and other claims to which the applicant may be entitled.

While various examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific examples described herein. It is, therefore, to be understood that the foregoing examples are presented by way of example only and that, within the scope of the appended claims and equivalents thereto, examples may be practiced otherwise than as specifically described and claimed. Examples of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method of synchronizing device clocks, the method comprising:
   receiving, at a first device, a first isochronous data stream from a peripheral device, the first isochronous data stream having a first interval based on a first clock, the first clock maintained at the peripheral device, the first isochronous data stream comprising at least one transmission event, wherein the at least one transmission event of the first isochronous data stream comprises a first anchor point;
   establishing a second isochronous data stream between the first device and a second device, the second isochronous data stream having a second interval associated with a second clock, the second clock maintained at the first device, wherein the second data stream includes at least one transmission event comprising a second anchor point, and wherein the at least one transmission event of the second data stream is received after a determined subinterval, wherein the determined subinterval is a difference between the first anchor point and the second anchor point;
   synchronizing the second clock with the first clock using the at least one transmission event; and
   reverting, in response to the first device, the second device, or the peripheral device determining that a link quality between the first device and the peripheral device falls below a predetermined threshold, to an unsynchronized state wherein the second interval of the second isochronous data stream is independent of the first isochronous data stream, and wherein the first device is configured to receive a link layer request from the second device over the second isochronous data stream to shift the second anchor point in response to the determined subinterval falling below a predetermined threshold.

2. The method of claim 1, wherein establishing the second isochronous data stream includes exchanging information about a relationship between the first device and the peripheral device.

3. The method of claim 1, wherein synchronizing the first clock with the second clock includes using a predictive algorithm to predict an expected increase or decrease in the determined subinterval and shifting the second anchor point prior to receiving a subsequent transmission event of the first isochronous data stream based on the expected increase or decrease in the determined subinterval.

4. The method of claim 3, wherein the expected increase or decrease in the determined subinterval is based at least in part on a link quality determined between the peripheral device and the first device, the link quality between the first device and the second device, or the link quality between the peripheral device and the second device.

5. The method of claim 3, wherein the at least one transmission event of the first isochronous data stream comprises a first receiving window, the first receiving window having a first initial duration, and the at least one transmission event of the second isochronous stream comprises a second receiving window, the second receiving window having a second initial duration, and wherein the second initial duration is configured to be widened by adding a maximum drift value to the second initial duration, wherein the maximum drift value is based at least in part on the latest anchor point of the first isochronous data stream.

6. The method of claim 5, wherein the maximum drift value is added before the second initial duration.

7. The method of claim 5, wherein the maximum drift value ranges between −2 ms and 2 ms.

8. The method of claim 1, wherein the first device and the second device are audio devices.

9. A computer program product for synchronizing device clocks, the computer program product including a set of non-transitory computer-readable instructions stored in a memory of a first device, the set of non-transitory computer-readable instructions being executable by a processor of the first device, and are configured to:
   receive a first isochronous data stream from a peripheral device, the first isochronous data stream having a first interval based on a first clock, the first clock maintained at the peripheral device, the first isochronous data stream comprising at least one transmission event, wherein the at least one transmission event of the first isochronous data stream comprises a first anchor point;
   establish a second isochronous data stream between the first device and a second device, the second isochronous data stream having a second interval associated with a second clock, the second clock maintained at the first device, wherein the second data stream includes at least one transmission event comprising a second anchor point, and wherein the at least one transmission event of the second data stream is received after a determined subinterval, wherein the determined subinterval is a difference between the first anchor point and the second anchor point;
   synchronize the second clock with the first clock using the at least one transmission event; and
   revert, in response to the first device, the second device, or the peripheral device determining that a link quality between the first device and the peripheral device falls below a predetermined threshold, to an unsynchronized state wherein the second interval of the second isochronous data stream is independent of the first isochronous data stream, and wherein the first device is configured to receive a link layer request from the second device over the second isochronous data stream to shift the second anchor point in response to the determined subinterval falling below a predetermined threshold.

10. The computer program product of claim 9, wherein establishing the second isochronous data stream includes exchanging information about a relationship between the first device and the peripheral device.

11. The computer program product of claim 9, wherein synchronizing the first clock with the second clock includes using a predictive algorithm to predict an expected increase or decrease in the determined subinterval and shifting the second anchor point prior to receiving a subsequent transmission event of the first isochronous data stream based on the expected increase or decrease in the determined subinterval.

12. The computer program product of claim 11, wherein the expected increase or decrease in the determined subinterval is based at least in part on a link quality determined between the peripheral device and the first device, the link quality between the first device and the second device, or the link quality between the peripheral device and the second device.

13. The computer program product of claim 9, wherein the at least one transmission event of the first isochronous data stream comprises a first receiving window, the first receiving window having a first initial duration, and the at least one transmission event of the second isochronous stream is comprises a second receiving window, the second receiving window having a second initial duration, and wherein the second initial duration is configured to be widened by adding a maximum drift value to the second initial duration, wherein the maximum drift value is based at least in part on the latest anchor point of the first isochronous data stream.

14. The computer program product of claim 13, wherein the maximum drift value is added before the second initial duration.

15. The computer program product of claim 13, wherein the maximum drift value ranges between −2 ms and 2 ms.

16. The computer program product of claim 9, wherein the first device and the second device are audio devices.

* * * * *